(12) United States Patent
Strengert et al.

(10) Patent No.: US 9,221,437 B2
(45) Date of Patent: Dec. 29, 2015

(54) CONTROLLING DEVICE FOR A BRAKE SYSTEM OF A VEHICLE AND METHOD FOR OPERATING A BRAKE SYSTEM OF A VEHICLE

(75) Inventors: Stefan Strengert, Stuttgart (DE); Michael Kunz, Steinheim an der Murr (DE)

(73) Assignee: ROBERT BOSCH GMBH, Stuttgart (DE)

(*) Notice: Subject to any disclaimer, the term of this patent is extended or adjusted under 35 U.S.C. 154(b) by 93 days.

(21) Appl. No.: 14/118,124

(22) PCT Filed: Mar. 20, 2012

(86) PCT No.: PCT/EP2012/054890
§ 371 (c)(1),
(2), (4) Date: Feb. 19, 2014

(87) PCT Pub. No.: WO2012/156130
PCT Pub. Date: Nov. 22, 2012

(65) Prior Publication Data
US 2014/0152083 A1    Jun. 5, 2014

(30) Foreign Application Priority Data
May 17, 2011    (DE) .......................... 10 2011 075 983

(51) Int. Cl.
| | | |
|---|---|---|
| *B60T 8/64* | (2006.01) | |
| *B60T 8/17* | (2006.01) | |
| *B60T 1/10* | (2006.01) | |
| *B60T 13/58* | (2006.01) | |
| *B60W 10/188* | (2012.01) | |
| *B60W 30/18* | (2012.01) | |

(52) U.S. Cl.
CPC ... *B60T 8/17* (2013.01); *B60T 1/10* (2013.01); *B60T 13/586* (2013.01);
(Continued)

(58) Field of Classification Search
CPC .......... B60T 8/17; B60T 8/48; B60T 13/586; B60T 1/10; B60T 2270/60; B60T 2270/604; B60L 7/24; B60L 7/26; B60W 30/18127
USPC .................................................. 303/151, 152
See application file for complete search history.

(56) References Cited

U.S. PATENT DOCUMENTS

| | | | |
|---|---|---|---|
| 5,632,534 | A | 5/1997 | Knechtges |
| 5,853,229 | A | 12/1998 | Willmann et al. |

(Continued)

FOREIGN PATENT DOCUMENTS

| | | | |
|---|---|---|---|
| CN | 1978238 A | 6/2007 | |
| CN | 1978256 A | 6/2007 | |

(Continued)

OTHER PUBLICATIONS

International Search Report for PCT/EP2012/054890, issued on Jun. 25, 2012.

*Primary Examiner* — Thomas J Williams
(74) *Attorney, Agent, or Firm* — Kenyon & Kenyon LLP

(57) ABSTRACT

A controlling device for a brake system, including a generator control device, by which a setpoint generator braking torque may be set regarding an actuating intensity of a manipulation of a brake actuating element; and a valve control device, by which, if the stipulated setpoint generator braking torque is equal to zero, at least one accumulator opening valve of a brake circuit may be forced into a first valve position in such a manner, that displacement of brake fluid from a master brake cylinder into at least one wheel brake caliper of the brake circuit may be effected and displacement of brake fluid from the master brake cylinder into an accumulator of the brake circuit is prevented. If the stipulated setpoint generator braking torque is not equal to zero, the at least one accumulator opening valve may be forced into a second valve position.

8 Claims, 4 Drawing Sheets

(52) U.S. Cl.
CPC ........ *B60T 2270/604* (2013.01); *B60W 10/188* (2013.01); *B60W 30/18127* (2013.01); *B60W 2510/083* (2013.01); *B60W 2710/182* (2013.01)

(56) References Cited

U.S. PATENT DOCUMENTS 8,123,310 B2 * 2/2012 Haupt et al. .................. 303/152

| | | | |
|---|---|---|---|
| 2007/0013230 A1 | 1/2007 | Yang | |
| 2010/0244547 A1 * | 9/2010 | Gilles et al. .................. | 303/3 |
| 2014/0152082 A1 * | 6/2014 | Strengert et al. .................. | 303/3 |

FOREIGN PATENT DOCUMENTS

| DE | 19604134 | 8/1997 |
|---|---|---|
| JP | 2004155403 A | 6/2004 |

\* cited by examiner

CONTROLLING DEVICE FOR A BRAKE SYSTEM OF A VEHICLE AND METHOD FOR OPERATING A BRAKE SYSTEM OF A VEHICLE

FIELD OF THE INVENTION

The present invention relates to a controlling device for a brake system of a vehicle. In addition, the present invention relates to a method for operating a brake system of a vehicle.

BACKGROUND INFORMATION

A method and a device for controlling a brake system of a motor vehicle having an electrical drive unit is described in German Published Patent Appln. No. 196 04 134 A1. When the vehicle is decelerated using the electrical drive unit for simultaneously charging a battery, the hydraulic braking torque applied to at least one wheel by the at least one wheel brake caliper of the hydraulic brake system should be reduced/deactivated in spite of the manipulation of the brake pedal. To that end, the pressurized media displaced from the master brake cylinder to the wheel brakes via manipulation of the brake pedal should be counteracted, in that the pressurized media displaced from the master brake cylinder is transported via the at least one wheel brake caliper into at least one accumulator, by opening the exhaust valves of the hydraulic brake system. In this manner, regenerative braking carried out by the electrical drive unit should be able to be screened.

SUMMARY

The present invention provides a controlling device for a brake system of a vehicle, and a method for operating a brake system of a vehicle.

The present invention provides the advantage that screening of the stipulated setpoint generator braking torque may be carried out, while transmission of force between the brake actuating element and the piston of the master brake cylinder does not occur/is prevented. Thus, in response to manipulating the brake actuating element, the driver does not notice any difference when the volume of brake fluid transferred from the master brake cylinder is displaced into the accumulator, and not into the at least one corresponding wheel brake cylinder. Therefore, the present invention ensures an advantageous user-friendliness of the brake actuating element for the driver.

The advantage described in the paragraph above may be provided without the "spring characteristics" of the at least one wheel brake caliper and the corresponding accumulator additionally having to be adapted to one another. Thus, in the case of the advantageous, present invention, it is not necessary to adjust the spring in the accumulator to the at least one corresponding wheel brake caliper. This is particularly advantageous, since an accumulator spring characteristic adapted to at least one wheel brake caliper is rarely achievable in a satisfactory manner and/or is achievable only at an extremely high cost.

The advantage achievable via the present invention may be ensured in a simple manner, by positioning the brake actuating element at the master brake cylinder, such that while the brake actuating element is manipulated at an actuating intensity not equal to zero but less than the minimum actuating intensity at which the driver's braking force applied to the brake actuating element is transmittable to the piston of the master brake cylinder, transmission of force between the brake actuating element and the piston of the master brake cylinder does not occur/is prevented. At the same time, the present invention provides the driver with the option of braking directly in the master brake cylinder by manipulating the brake actuating element at at least the minimum actuating intensity. Therefore, even if the functionality of the brake booster is affected, for example, due to impairment of the power supply of the brake system, reliable deceleration of the vehicle is still ensured.

The brake system implementable with the aid of the present invention may be described as a simple system expanded using a minimum of modification expenditure. Consequently, it is possible to obtain sufficient recuperative efficiency at a minimum additional cost. In the case of the present invention, the main reason for the increase in the recuperative efficiency is that the proposed brake system assists the driver in the modulating task in the case of a decreasing regenerative braking torque. The technology of the present invention is able to react to a reduced recuperative braking torque of the recuperative brake due to, e.g., a full energy store and/or a vehicle speed below the minimum speed needed for recuperative braking. In particular, this may be implemented without increasing the braking distance or the driver's perceiving a reaction while manipulating the brake actuating element.

It should be pointed out that the ability to implement the technology of the present invention does not require any free play formed at the brake actuating element, the brake booster, or in the master brake cylinder. Thus, even at the fall-back level, the driver is able to brake in the brake system.

The technology of the present invention allows screening while transmission of force between the brake actuating element and the piston of the master brake cylinder does not occur/is prevented. Thus, in the event of regenerative braking in place of hydraulic braking, the driver is not able to perceive any change in braking feel. Due to the non-occurring/prevented transmission of force between the piston of the master brake cylinder and the brake actuating element caused by, for example, a lack of a mechanical coupling in the case of an actuating intensity below the minimum actuating intensity, the counteracting force generated by the build-up of hydraulic pressure does not bear on the brake actuating element, but only on the boosting force of the brake booster. Therefore, the change in the counteracting force is not noticeable to the driver at the brake actuating element.

One may also refer to this as screening within the jump-in range (of the brake booster). The jump-in range constitutes an actuating range of the brake booster, for example, a vacuum booster, in which there is no mechanical coupling between the brake actuating element and the piston of the master brake cylinder. Nevertheless, braking is already carried out in the master brake cylinder in the jump-in range. Thus, the brake system does not have any free play and may be reliably operated, in particular, at the fall-back level.

With the aid of the technology according to the present invention, braking requests may also be carried out without manipulating the brake actuating element (instances of active pressure build-up).

DETAILED DESCRIPTION

Figure 1:
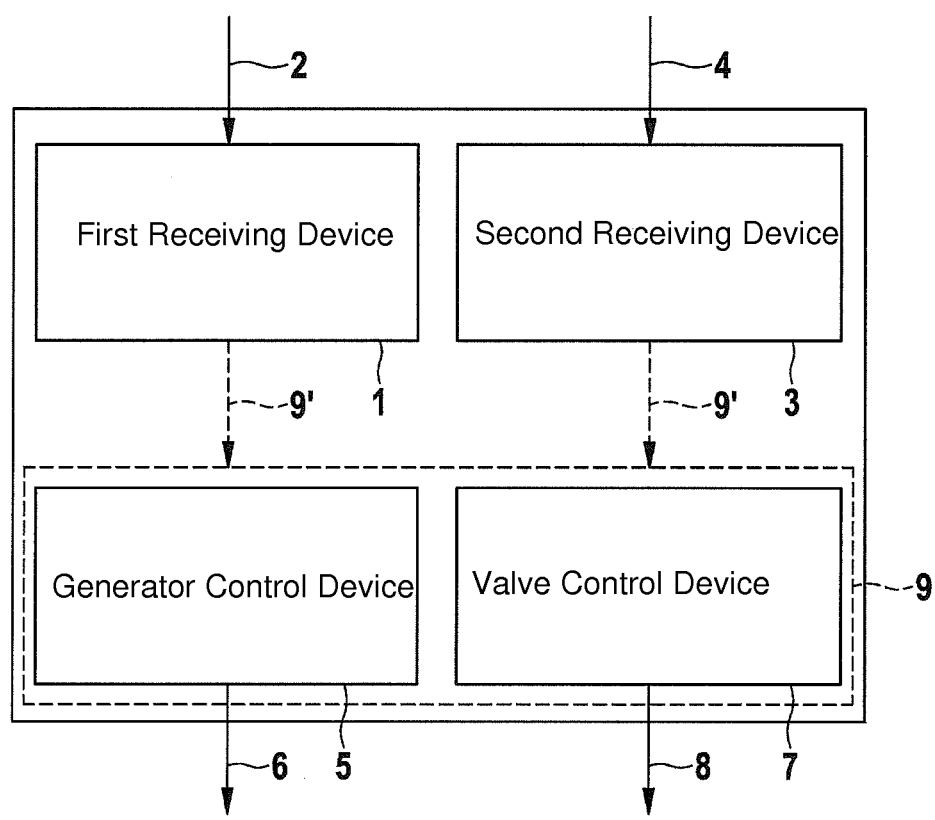
FIG. 1 shows a schematic representation of a specific embodiment of the controlling device.

FIG. 1 shows a schematic representation of a specific embodiment of the controlling device.

The controlling device schematically represented in FIG. 1 may be used for a brake system of a vehicle. The controlling device has a first receiving device 1, with the aid of which a sensor signal 2 regarding an actuating intensity of the manipulation of a brake actuating element (not shown) of the brake system may be received. In addition, the controlling device includes a second receiving device 3, with the aid of which an information signal 4 regarding at least one theoretically applicable generator braking torque of a generator of the braking system (not shown) may be received.

A generator control device 5 of the controlling device is configured to stipulate a setpoint generator braking torque of the generator in view of sensor signal 2 and information signal 4, and to output a generator control signal 6 corresponding to the setpoint generator braking torque to the generator. The setpoint generator braking torque may be set by generator control device 5 in view of information signal 4 and a function of a variable derived from sensor signal 2. The variable derived from sensor signal 2 may be, for example, a braking distance, a braking force and/or a braking pressure, or at least a suitable variable regarding the actuating intensity of the manipulation of the brake actuating element. The function preferably specifies a preferred generator braking torque. The function is at a maximum when a variable derived from the sensor signal is equal to a minimum actuating intensity, at which a driver's braking force applied to the brake actuating element is transmittable to a displaceable piston of a master brake cylinder (not shown).

Therefore, in the case of an actuating intensity below the minimum actuating intensity, when a transmission of force between the displaceable piston of the master brake cylinder and the brake actuating element is stopped/prevented/not ensured, the function/the preferred generator braking torque may increase with the increasing variable. In particular, in the case of an actuating intensity below the minimum actuating intensity, the preferred generator braking torque may correspond to the actuating intensity of the manipulation of the brake actuating element/to the driver's braking command. On the other hand, in the case of an actuating intensity greater than minimum actuating intensity, the function/the preferred generator braking torque does not have a characteristic curve proportional to the variable. In the case of an actuating intensity greater than the minimum actuating intensity, the function/the preferred generator braking torque preferably decreases continuously. In particular, at or above an actuating intensity greater than the minimum actuating intensity, the function/the preferred generator braking torque may tend to zero.

Thus, at a setpoint generator braking torque comparatively high with respect to the total braking torque, the controlling device is configured to utilize the stopped/prevented/unensured transmission of force between the displaceable piston of the master brake cylinder and the brake actuating element for recuperation. As explained below in more detail, this provides advantageous ease of operation to the driver in spite of the recuperation and the simultaneously implementable masking.

In addition, generator control device 5 may be configured to set the largest of the theoretically applicable generator braking torques, which are still less than or equal to the function of the variable derived from the sensor signal, as the setpoint generator braking torque. Further functions implementable by generator control device 5 are described further below.

The controlling device also has a valve control device 7, with the aid of which a valve control signal 8 may be output to at least one accumulator opening valve (not shown) of a brake circuit of the brake system. If the stipulated setpoint generator braking torque is equal to zero, the at least one accumulator opening valve may be forced into a first valve position by valve control signal 8, through which displacement of brake fluid from a master brake cylinder of the brake system into at least one wheel brake caliper of the brake circuit may be effected/ensured, while displacement of brake fluid from the master brake cylinder into an accumulator of the brake circuit is prevented.

If the stipulated setpoint generator braking torque is not equal to zero, valve control device 7 may output a valve control signal 8, which forces the at least one accumulator opening valve into a second valve position in such a manner, that displacement of brake fluid from the master brake cylinder into the accumulator may be effected/ensured. Examples of the at least one accumulator opening valve and its installation positions in a brake system are described in detail below.

Valve control device 7 may be integrated, together with generator control device 5, into evaluation electronics 9. In this case, the need for separately supplying control devices 5, 7 with information to be evaluated 9' is eliminated. However, the controlling device is not limited to the integration of control devices 5 and 7 in evaluation electronics 9.

As an option, the controlling device additionally includes a pump control device (not shown), with the aid of which a desired pump mode of a pump of the brake circuit may be set in view of a temporal decrease in the setpoint generator braking torque. The pump, by which brake fluid may be pumped from the accumulator of the brake circuit to the at least one wheel brake caliper of the brake circuit, may be controlled by the pump control device in accordance with the desired pump mode.

In particular, the controlling device may be configured to execute the method steps of the methods described below. Therefore, at this point, the method of functioning of the controlling device will not be discussed in further detail.

Figure 2:
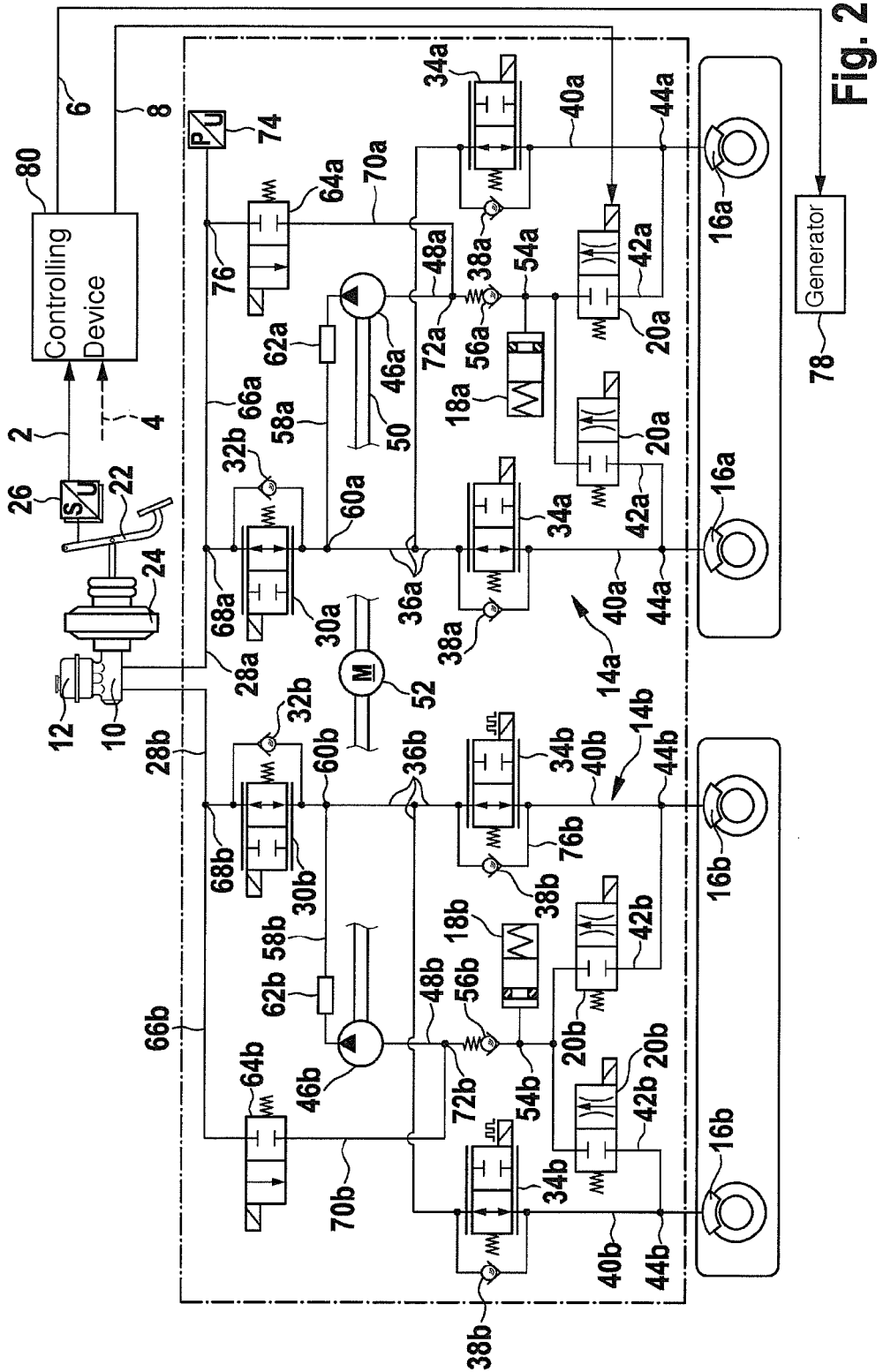
FIG. 2 shows a schematic representation of a brake system having the controlling device.

FIG. 2 shows a schematic representation of a brake system having the controlling device.

The brake system schematically represented in FIG. 2 may be used, for example, in a hybrid and in an electric vehicle. However, the ability to use the brake system described in the following is not limited to use in a hybrid or an electric vehicle.

The brake system has a master brake cylinder 10, which may take the form of a tandem master brake cylinder, for example. However, the brake system is not limited to the use of a tandem master brake cylinder. Master brake cylinder 10 may be connected to a brake medium reservoir 12 via at least one brake fluid exchange opening, such as an expansion bore.

At least one brake circuit 14a and 14b is hydraulically connected to master brake cylinder 10. The at least one brake circuit 14a and 14b includes at least one wheel brake caliper 16a and 16b, an accumulator 18a and 18b and at least one accumulator opening valve 20a and 20b assigned to accumulator 18a or 18b. One may describe the method of functioning of the at least one accumulator opening valve 20a and 20b as follows. When the at least one accumulator opening valve 20a and 20b is in a first valve position, displacement of brake fluid from the master brake cylinder into the at least one wheel brake caliper 16a and 16b may be effected/ensured, while displacement of brake fluid from master brake cylinder 10 into the at least one accumulator 18a and 18b is prevented; and when the at least one accumulator opening valve 20a and 20b is in a second valve position, displacement of brake fluid from master brake cylinder 10 into accumulator 18a or 18b may be effected/ensured.

In a first exemplary embodiment of the at least one accumulator opening valve 20a and 20b, in the second valve position, a portion of the volume of brake fluid forced out of master brake cylinder 10 may still be transferred into the at least one wheel brake caliper 16a and 16b. In the same way, when the at least one accumulator opening valve 20a and 20b is in the second valve position, the volume of brake fluid forced out of master brake cylinder 10 may be transferred into accumulator 18a or 18b via the at least one wheel brake caliper 16a and 16b. For example, the at least one accumulator opening valve 20a and 20b may be configured to selectively block off and open a hydraulic connection between the at least one wheel brake caliper 16a and 16b and corresponding accumulator 18a and 18b.

In one advantageous specific embodiment, the at least one accumulator opening valve 20a and 20b is situated in a hydraulic connection between the at least one wheel brake caliper 16a and 16b and the corresponding accumulator 18a and 18b. In particular, the at least one accumulator opening valve 20a and 20b may be a wheel exhaust valve. For determining a filling location of a volume of brake fluid forced out of master brake cylinder 10 and, in addition, for fulfilling the function of a wheel exhaust valve, this multifunctionality of the at least one accumulator opening valve 20a and 20b may allow additional components at the brake system to be eliminated. This ensures a cost-effective design and a lower space requirement of the brake system.

In a second exemplary embodiment of the at least one accumulator opening valve 20a and 20b, when the at least one accumulator opening valve 20a and 20b is in the second valve position, displacement of brake fluid between the master brake cylinder and the at least one accumulator 16a and 16b may be prevented. Thus, the brake system is not limited to the use of a wheel exhaust valve as the at least one accumulator opening valve 20a and 20b. For example, at least one valve may also be used as the at least one accumulator opening valve 20a and 20b, the at least one valve(s) being situated in brake circuit 14a or 14b in such a manner, that when the at least one valve is in a first (overall) valve position, a first hydraulic connection between master brake cylinder 10 and the at least one wheel brake caliper 16a and 16b is opened and a second hydraulic connection between master brake cylinder 10 and accumulator 18a and 18b is closed, whereas when the at least one valve is in a second (overall) valve position, the second hydraulic connection is open and, at the same time, displacement of brake fluid from master brake cylinder 10 into the at least one wheel brake caliper 16a and 16b is prevented.

For example, the wheels assigned to brake circuit 14a or 14b may be grouped diagonally at a vehicle. In this case, the brake system is designed for X-type brake circuit partitioning, to which it is not limited, however. For example, the brake system may also be used for II-type brake circuit partitioning, in which the wheels assigned to a brake circuit 14a and 14b are situated on a common axle.

Preferably, the brake system also has a brake actuating element 22, which is positioned at master brake cylinder 10 in such a manner, that when brake actuating element 22 is manipulated at at least a minimum actuating intensity, a driver's braking force applied to brake actuating element 22 is transmitted to a displaceable piston of master brake cylinder 10 (not shown) in such a manner, that the piston of the master brake cylinder is displaceable by the braking force of the driver. Using this displacement of the piston of the master brake cylinder, an internal pressure in at least one chamber of master brake cylinder 10 is preferably increased. In the brake system described here, brake actuating element 22 is additionally positioned at master brake cylinder 10 in such a manner, that while the brake actuating element is manipulated at an actuating intensity not equal to zero but less than the minimum actuating intensity, transmission of force between brake actuating element 22 and the piston of the master brake cylinder is prevented. This provides the advantage that while brake actuating element 22 is manipulated at the actuating intensity below the minimum actuating intensity, the driver is "decoupled" from master brake cylinder 10 and the at least one brake circuit 14a and 14b connected to it and therefore does not perceive any reaction of the pressure present in them. The advantageous applicability of this advantage towards screening a generator braking torque will be discussed below in more detail.

In one preferred specific embodiment, the illustrated brake system also has a brake booster 24, such as a vacuum brake booster. In place of a vacuum brake booster, the brake system may also include another type of brake booster 24, such as a hydraulic and/or an electromechanical boosting device. In particular, brake booster 24 may be a continuously adjustable/continuously controllable brake booster.

As a rule, at least while the brake actuating element is manipulated at less than the minimum actuating intensity, brake booster 24 may be used to displace the piston of the master brake cylinder in such a manner, that a volume of brake fluid is displaceable out of master brake cylinder 10. Due to the advantageous method of functioning of the at least one accumulator opening valve 20a and 20b, the volume of brake fluid displaced out of the master brake cylinder is selectively displaceable into accumulator 18a and 18b or into the at least one wheel brake caliper 16a and 16b. In addition to the volume of brake fluid, another additional (negligibly small) volume of liquid may be displaced out of master brake cylinder 10 due to the displacement of the piston of the master brake cylinder, this additional volume of brake fluid being able to be transferable into the at least one wheel brake caliper 16a and 16b independently of the valve position of the at least one accumulator opening valve 20a and 20b.

As a rule, a brake booster 24 has an infinite amplification at the start of its actuating path. In this range, there is still no mechanical coupling between brake actuating element 22, for example, a brake pedal, and the piston of the master brake cylinder. One may also refer to this as a lack of a mechanical coupling between brake actuating element 22 and the brake system. In this range, the braking force of the driver is not used for actuating master brake cylinder 10, that is, for displacing the piston of the master brake cylinder, but only used for controlling brake booster 24.

Therefore, the start of the actuating path, at which the actuating intensity is not equal to zero but still under the minimum actuation, is often called the jump-in range, as well. Outside of the jump-in range, there is a mechanical coupling between brake actuating element 22 and the piston of the master brake cylinder. Thus, outside of the jump-in range, the braking force of the driver is used for displacing the piston of the master brake cylinder and, therefore, for braking in the at least one wheel brake caliper 16a and 16b. This operation may be assisted by the additional force of brake booster 24.

Therefore, the feature of brake booster 24 may be used for braking in the master brake cylinder without a mechanical coupling/transmission of force between brake actuating element 22 and the piston of the master brake cylinder. Thus, the start of the actuating path, where an actuating intensity is not equal to zero but under the minimum actuation, i.e., the jump-in range, may be advantageously used for screening a generator braking torque, as explained below.

Preferably, the brake system also includes a brake actuating element sensor 26, with the aid of which the actuating intensity of the manipulation of brake actuating element 22 by the driver is ascertainable. Brake actuating element sensor 26 may include, for example, a pedal displacement sensor, a differential path sensor and/or a rod displacement sensor. However, in order to measure the actuating intensity, which corresponds to the driver's braking command, a different type of sensor system may also be used in place of, or in addition to, the types of sensors enumerated here.

In addition, the brake system may have additional free play, which may be formed either at brake actuating element 22, e.g., a brake pedal, at brake booster 24 and/or at master brake cylinder 10. Since the technology of the present invention does not require such free play at the brake system, this will not be discussed here in further detail.

In the case of the specific embodiment illustrated, the brake system has two brake circuits 14a and 14b, which are identically configured. However, the ability to produce the brake system is not limited to either this number of brake circuits 14a and 14b or to the identical design of its brake circuits 14a and 14b. In particular, the following explanations regarding brake circuits 14a and 14b are only to be understood as exemplary: Each of brake circuits 14a and 14b has two wheel brake calipers 16a and 16b, which, together, are assigned to an accumulator 18a and 18b. Brake circuits 14a and 14b are connected to master brake cylinder 10 by a supply line 28a and 28b, which leads to a brake-circuit-specific selector valve 30a or 30b having a check valve 32a or 32b positioned in parallel with it. In each instance, a wheel intake valve 34a and 34b assigned to a wheel brake caliper 16a or 16b is connected to selector valve 30a or 30b via a branching line 36a or 36b. In each instance, a check valve 38a or 38b is positioned in parallel with each of the wheel intake valves 34a and 34b. Wheel intake valves 34a and 34b are connected to corresponding wheel brake caliper 16a and 16b via a line 40a or 40b. Wheel exhaust valves also used as accumulator opening valves 20a and 20b are connected to corresponding brake caliper 16a or 16b via a line 42a or 42b and a branch point 44a or 44b formed in lines 40a and 40b.

Each of brake circuits 14a and 14b has a pump 46a or 46b, which is connected to the two wheel exhaust valves of corresponding brake circuit 14a and 14b via a branching line 48a or 48b. For example, pumps 46a and 46b may take the form of single-plunger pumps. However, differently designed modulation systems, which include, for example, at least one pump having several pistons, at least one asymmetric pump and/or at least one gear pump, may also be used in place of such a type of pump. In particular, pumps 46a and 46b may be positioned on a common shaft 50 of a pump motor 52.

The accumulators 18a and 18b already described above may be connected to lines 48a and 48b via branch points 54a and 54b, respectively. In addition, a pressure-relief valve 56a and 56b may be situated in each of lines 48a and 48b. While the suction side of a pump 46a and 46b is connected to the wheel exhaust valves used as accumulator opening valves 20a and 20b, the delivery side may be connected to selector valve 30a or 30b of corresponding brake circuit 14a or 14b via a further line 58a and 58b and a branch point 60a or 60b formed in line 36a and 36b.

Optimally, a pump damping element 62a and 62b may also be inserted into line 58a and 58b. In the specific embodiment illustrated, each of brake circuits 14a and 14b also has a high-pressure control valve 64a and 64b, which is connected to master brake cylinder 10 via a line 66a or 66b and a branch point 68a or 68b formed in supply line 58a and 58b. In addition, high-pressure control valve 64a and 64b is hydraulically connected by a line 70a and 70b having a branch point 72a and 72b formed in line 48a and 48b, to the components connected to it. Furthermore, at least one brake circuit 14a or 14b may have a pressure sensor 74, which may be connected to line 66a via a branch point 76.

The brake system also has a generator 78 and the controlling device 80 already described above, which receives signals 2 and 4 from brake actuating element sensor 26, generator 78, a battery (not shown) and/or a bus system and outputs control signals 6 and 8 to generator 78 and the at least one accumulator opening valve 20a and 20b. Regarding the method of functioning of controlling device 80, reference is made to the remarks above.

Figure 3:
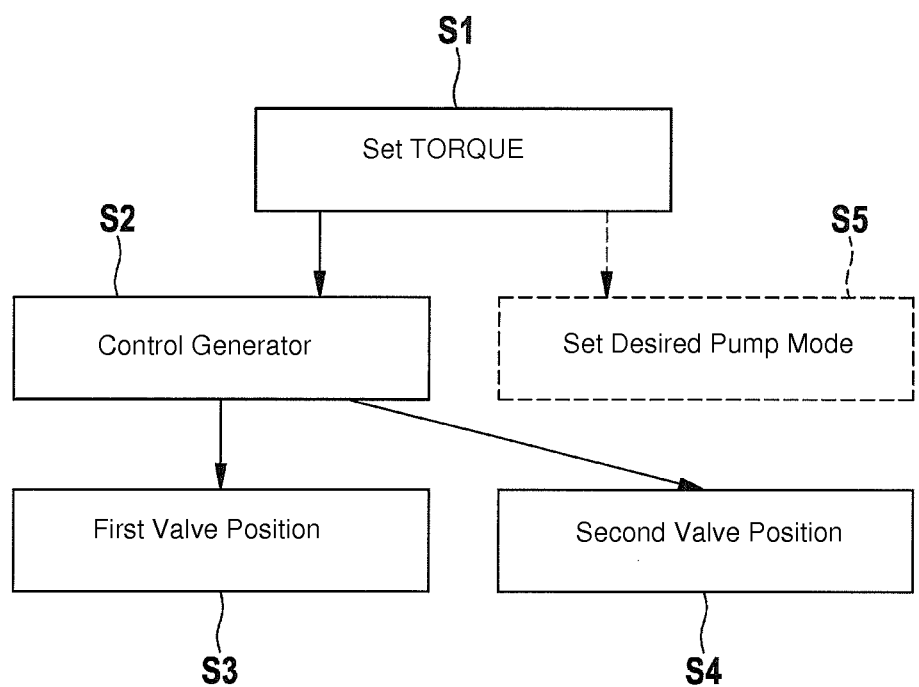
FIG. 3 shows a flow chart for illustrating a first specific embodiment of the method.

FIG. 3 shows a flow chart for illustrating a first specific embodiment of the method.

In particular, the method described below may be executed at least partially by the controlling device already described above. However, the ability to implement the method is not limited to the use of the controlling device or the above-described brake system.

In a method step S1, a setpoint generator braking torque is set in view of an actuating intensity variable regarding an actuating intensity of the manipulation of a brake actuating element of the brake system, and in view of an information item regarding at least one theoretically applicable generator braking torque of a generator of the brake system. During execution of the method, method step S1 may be repeated as often as needed, for example, at a predefined frequency or after a change in the actuating intensity. Therefore, an increased actuating intensity variable may be detected with respect to an increased actuating intensity of the manipulation of the brake actuating element. The increased actuating intensity variable is compared to a threshold value regarding a minimum actuating intensity (already described above), at which a braking force of a driver applied to the brake actuating element is transmitted to a displaceable piston of the master brake cylinder.

If the increased actuating intensity variable exceeds the threshold value, the setpoint generator braking torque is held constant or reduced in spite of the increased actuating intensity variable. In method step S1, if the increased actuating intensity variable is (still) below the threshold value, an increased generator braking torque is preferably ascertained in view of the increased actuating intensity variable. Subsequently, the largest of the theoretically applicable generator braking torques, which are still less than or equal to the increased generator braking torque, is set as the setpoint generator braking torque. (If no theoretically applicable generator braking torque less than or equal to the increased generator braking torque is ascertainable, the setpoint generator braking torque is set equal to zero.)

In a method step S2, the generator is controlled in view of the stipulated setpoint generator braking torque. Preferably, the generator controlled in method step S2 (reliably) maintains the setpoint generator braking torque.

In the further method steps S3 and S4, the stipulated setpoint generator braking torque is screened. To that end, if the stipulated setpoint generator braking torque is equal to zero, then, in a method step S3, at least one accumulator opening valve of a brake circuit of the brake system is forced into a first valve position, through which a displacement of brake fluid from the master brake cylinder of the brake system into at least one wheel brake caliper of the brake circuit is effected/ensured. However, displacement of brake fluid from the master brake cylinder into an accumulator of the brake circuit is prevented by the at least one accumulator opening valve forced into the first valve position.

Therefore, using the brake actuating element, e.g., a brake pedal, the driver brakes in the at least one wheel brake caliper, via the master brake cylinder. In order to boost the braking action of the driver, a brake booster may additionally be used. Thus, during method step S3, the behavior of the brake system controlled with the aid of the method corresponds to a (conventional) brake system not including an executed screening function.

If the stipulated setpoint generator braking torque is not equal to zero, then, in a method step S4, the at least one accumulator opening valve is forced into a second valve position, via which displacement of brake fluid from the master brake cylinder into the accumulator is effected/ensured and the hydraulic braking torque of the at least one wheel brake caliper of the brake circuit is held constant or reduced in spite of the displacement of the brake fluid from the master brake cylinder into the brake circuit. Therefore, in spite of the manipulation of the brake actuating element by the driver and the pressure build-up in the master brake cylinder associated with it, no (unwanted) hydraulic braking torque is built up. Examples of the at least one accumulator opening valve have already been mentioned above.

With the aid of the method, it may be ensured that a hydraulic braking torque of at least one wheel brake caliper is adapted to an applicable and currently applied generator braking torque of a generator in such a manner, that a total braking torque selected by the driver is reliably maintained. In this context, it is advantageously ensured that the largest applicable generator braking torque for decelerating the vehicle is applied, in order to charge a battery chargeable by the generator within a comparatively short period of time.

In a method step S5, a desired pump mode of a pump of the brake circuit is set in view of a (detected or stipulated) temporal reduction in the setpoint generator braking torque, and the pump is controlled in such a manner, that brake fluid is pumped from the accumulator of the brake circuit to the at least one wheel brake caliper of the brake circuit. Thus, the hydraulic braking torque of the at least one wheel brake caliper may also be adapted to the temporal decrease in the setpoint generator braking torque.

As a rule, regenerative braking is only feasible, when the battery capable of being charged by the generator has a charge value below a threshold value and/or the vehicle is traveling at a speed above a predefined minimum speed. Consequently, during generative braking, a stipulated/known/easily measurable generator braking torque, which, however, is often not able to be held constant over time due to the factors mentioned here, acts upon the vehicle. In spite of the temporal variation/cessation of the generator braking torque, it is desirable for the total braking torque selected by the driver to be reliably maintained. This is advantageously implementable with the aid of the method described here.

Since, in the method, recuperative braking is mainly carried out at a high setpoint generator braking torque in response to an actuating intensity below the minimum actuating intensity, no reactive force/counteracting force is transferred to the brake actuating element due to the prevented transmission of force between the brake actuating element and the master brake cylinder. Consequently, in spite of purely hydraulic braking, the driver does not sense any counteracting force at the brake actuating element, as in the case of a mechanical coupling between the brake actuating element and the master brake cylinder. In the same way, in the case of purely regenerative braking, the driver does not notice any lack of counteracting force, since, in the case of an actuating intensity below the minimum actuating intensity, he or she is not accustomed to sensing a counteracting force caused by the at least one wheel brake caliper.

Figure 4:
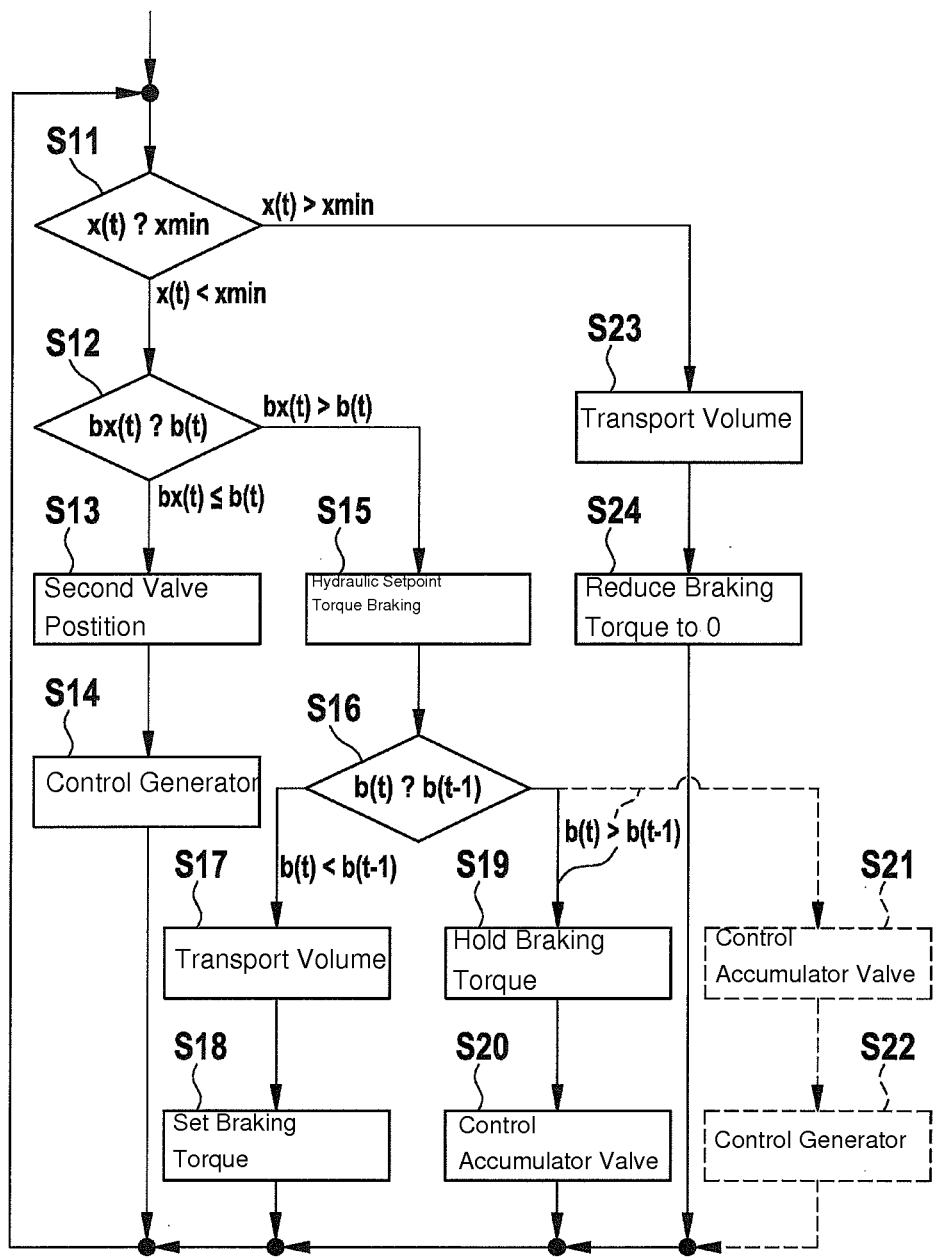
FIG. 4 shows a flow chart for illustrating a second specific embodiment of the method.

FIG. 4 shows a flow chart for illustrating a second specific embodiment of the method.

The ability to execute the method described below is not limited to the use of the above-described controlling device or the brake system equipped with it, although the method is at least partially implementable with the aid of them.

In one method step S11, a received sensor signal regarding an actuating intensity x(t) of the manipulation of the brake actuating element by the driver is compared to a threshold value regarding a minimum actuating intensity xmin; in the case of manipulating the brake actuating element at an actuating intensity x(t) below minimum actuating intensity xmin, transmission of force between the brake actuating element and a displaceable piston of a master brake cylinder being prevented. In contrast, in the case of manipulating the brake actuating element at at least minimum actuating intensity xmin, a braking force of the driver applied to the brake actuating element is transmitted to the displaceable piston of the master brake cylinder in such a manner, that it is displaceable by the braking force of the driver, and consequently, an internal pressure in at least one chamber of the master brake cylinder may be increased. For example, the minimum actuating intensity may correspond to a total braking torque of 0.2 g.

If the actuating intensity x(t) corresponding to the sensor signal is below the minimum actuating intensity xmin corresponding to the threshold value, or if the sensor signal is under the threshold value, then, in a method step S12, the sensor signal is compared to an information signal regarding at least one theoretically applicable generator braking torque b(t). In this context, it is checked, for example, if a generator braking torque bx(t) corresponding to the actuating intensity is currently applicable by the generator. If this is the case, then method step S13 (method step S4) is subsequently carried out.

In method step S13, the at least one accumulator opening valve is forced into the second valve position, in which displacement of brake fluid from the master brake cylinder into the accumulator is ensured. For example, the at least one wheel exhaust valve used as an accumulator opening valve may be opened. Consequently, it is ensured that in spite of the manipulation of the brake actuating element and the displacement of the piston of the master brake cylinder associated with it, a hydraulic braking torque is not applied to a wheel of the vehicle by the at least one wheel brake caliper. In this manner, the total braking torque requested by the driver may be used completely for charging the battery via regenerative braking. Since, in the case of an actuating intensity x(t) below minimum actuation xmin, there is no transmission of force between the brake actuating element and the piston of the master brake cylinder, the driver does not sense that the volume of brake fluid displaced from the master brake cylinder is displaced into the accumulator, and not into the at least one wheel brake caliper.

One may also describe this, such that there is no mechanical coupling between the brake actuating element and the piston of the master brake cylinder within a jump-in range defined by minimum actuation xmin, and consequently, due to the fundamental lack of counteracting pedal force in the jump-in range, the driver is unable to determine the component into which the volume of brake fluid is displaced. Thus, from the counteracting pedal force, the driver does not sense whether deceleration is carried out hydraulically or generatively.

In the method step S14 (method step S2) subsequently carried out, the generator is controlled in such a manner, that the actual braking torque of the generator corresponds to the stipulated setpoint generator braking torque, in particular, to the total, requested braking torque. This ensures rapid charging of the battery.

In method step S12, if it is determined that deceleration may only be carried out purely hydraulically (only a currently applicable generator braking torque b(t) equal to zero), then (in a method step not shown,) the at least one accumulator opening valve is forced into the first valve position, in which displacement of brake fluid from the master brake cylinder into the at least one wheel brake caliper is effected/ensured, while displacement of brake fluid from the master brake cylinder into the accumulator is prevented. To that end, for example, the at least one wheel exhaust valve used as an accumulator opening valve may be closed.

If actuating intensity x(t) is still below minimum actuating intensity xmin, even though a braking torque bx(t) corresponding to actuating intensity x(t) is greater than the (maximum) applicable generator braking torque bx(t), then deceleration may be carried out both regeneratively and hydraulically. To that end, in method step S15 (method step S3), a hydraulic setpoint braking torque equal to a difference of braking torque bx(t) (corresponding to actuating intensity x(t)) and the (maximum) generator braking torque bx(t) currently applicable may be built up.

To that end, at a total braking torque (braking command of the driver) greater than the (maximum) applicable generator braking torque b(t), the at least one accumulator opening valve is preferably forced from the second valve position into the first valve position. For example, the at least one exhaust valve used as an accumulator opening valve is closed. In this manner, a volume corresponding to the difference between the braking torque bx(t) corresponding to actuating intensity x(t) and the (maximum) applicable generator braking torque b(t) is displaceable into the at least one wheel brake caliper. Consequently, in accordance with the increase in the driver's braking command, a hydraulic braking torque may also be built up in addition to the generator braking torque, using a pressure build-up in the at least one wheel brake caliper. The sum of the generator braking torque and the hydraulic braking torque preferably corresponds to the driver's braking command/the actuating intensity x(t).

Thus, in the case of an actuating intensity x(t) below minimum actuating intensity xmin, i.e., in the case of a driver's braking command within the jump-in range, deceleration may be selectively carried out purely hydraulically, hydraulically and regeneratively (method step S15), or purely regeneratively (method step S13). If the currently applicable generator braking torque (regenerative braking torque) allows purely regenerative braking, then forcing the at least one accumulator opening valve into the second valve position ensures that the volume displaced out of the master brake cylinder by the driver is displaced into the accumulator, and that therefore, no hydraulic braking torque is built up. At a driver's desired braking that is greater than the maximum applicable generator braking torque, at least a portion of the vehicle deceleration may be produced by the at least one wheel brake caliper.

If transmission of force between the brake actuating element and the piston of the master brake cylinder is prevented when an actuating intensity x(t) is below minimum actuation xmin, the driver does not sense from the counteracting force at the brake actuating element, where the volume displaced out of the master brake cylinder by him or her is transferred. Therefore, the driver does not notice any difference between the execution of method step S15 and the execution of method step S13. Nevertheless, using a brake actuating element sensor system positioned at the brake actuating element, the driver's braking command is ascertainable and the vehicle deceleration may be correspondingly set in a reliable manner.

If, during the execution of the method, it is determined that actuating intensity x(t), i.e., the current braking request of the driver, is increasing, then, using method steps S11 and S12, it is checked again, whether current actuating intensity x(t) is still below minimum actuating intensity xmin, i.e., whether the driver's braking request is still within the jump-in range, and whether a braking torque bx(t) corresponding to actuating intensity x(t) is still less than or equal to (maximum) applicable generator braking torque b(t).

After method step S15, in a method step S16, it is checked if the (maximum) applicable generator braking torque is decreasing (with time) (b(t)<b(t−1)). If this is detected, then the at least one accumulator opening valve is forced into/remains in the first valve position. For example, the at least one exhaust valve is/remains closed. Subsequently, in a method step S17, a volume may be transported by the at least one pump from the at least one accumulator to the at least one corresponding wheel brake caliper. In this manner, the braking pressure in the at least one wheel brake caliper is increased, which leads to an increase in the hydraulic braking torque. The volume transported by the pump preferably corresponds to the (temporal) decrease in the applicable generator braking torque. In a method step S18 executed previously, simultaneously or subsequently, the (maximum) applicable generator braking torque is set as a setpoint generator braking torque. (The generator is controlled accordingly.)

If, in method step S17, the entire volume previously displaced into the accumulator is conveyed back into the at least one brake circuit, then deceleration is subsequently carried out purely hydraulically. However, due to the prevented transmission of force between the brake actuating element and the piston of the master brake cylinder, this is not noticeable to the driver.

If, in method step S16, it is determined that the applicable generator braking torque increases during braking (b(t)>b(t−1)), then nevertheless, in an optional method step S19, the setpoint generator braking torque (and the applied generator braking torque) may be held constant. In a method step S20, by appropriately controlling the at least one accumulator opening valve, it may be ensured that a reduction or increase in actuating intensity x(t) during the currently executed braking only produces a change in the hydraulic braking torque. This is the case, until an actuating intensity x(t) above minimum actuating intensity xmin (that is, a departure from the jump-in range) or an actuating intensity x(t) corresponding to the currently applied generator braking torque is detected. This braking strategy has the advantage of maximum comfort. Neither a change in the characteristic curve of pedal travel versus pedal force, nor a change in the characteristic curve of pedal travel versus deceleration is detectable by the driver.

As an alternative to method steps S19 and S20, method steps S21 and S22 may also be performed. In a method step S21, the at least one accumulator opening valve may be controlled in such a manner, that the hydraulic braking torque adapts to an increase or decrease in the actuating intensity x(t) of the manipulation of the brake actuating element by the driver. In subsequent method step S22, the generator may be controlled in such a manner, that the applied generator braking torque is increased in accordance with the increase in the applicable generator braking torque. This is also possible without the driver specifying a change in his or her braking request. It is possible for the overly high deceleration to cause the driver to release the pedal, in which case the hydraulic braking torque is automatically reduced. This produces a noticeable change in the characteristic curve of pedal travel versus deceleration but maximizes the energy recovered via recuperation during the braking.

During the execution of method step S11, if it is determined that actuating intensity x(t) is/becomes greater than minimum actuating intensity xmin, that is, that the desired braking of the driver exits the jump-in range, then the at least one accumulator opening valve is forced into/remains in the first valve position. Subsequently, in a method step S23, the volume displaced into the at least one accumulator may be transported back into the at least one brake circuit by the pump.

In a further method step S24, the setpoint generator braking torque may be reduced to zero, and the generator may be controlled accordingly. At the end of method steps S23 and S24, the brake system may carry out purely hydraulic braking. This procedure does not produce a change in the characteristic curve of pedal travel versus pedal force and in the characteristic curve of pedal travel versus deceleration. It is not perceptible to the driver and, therefore, not associated with a reduction in comfort.

As an alternative to method step S24, after detecting that actuating intensity x(t) exceeds minimum actuating intensity xmin, i.e., after a departure from the jump-in range, it is also conceivable to not reduce the setpoint generator braking torque completely to zero. Instead, for example, the setpoint generator braking torque may continue to be selected in accordance with the pressure of the master brake cylinder, and the generator may be controlled accordingly. In this manner, the recuperative efficiency of the braking system may be increased, since regenerative braking is also carried out outside of the jump-in range, and consequently, the battery is charged more rapidly. The changed characteristic curve of pedal travel versus deceleration that results from this is perceptible to the driver, but is more likely to be experienced positively by him or her, since in the case of hard braking, he or she consequently notices a tactilely perceptible reaction of the brake system, as well.

By executing the method, it is possible to set the hydraulic braking torque of the at least one wheel brake caliper of the brake system in such a manner, that in spite of a temporal variation in applicable generator braking torque b(t), the desired braking selected by the driver is reliably maintained during recuperation. If (maximum) applicable generator braking torque b(t) is sufficient for completely implementing the desired braking of the driver, then braking may be carried out purely generatively, which means that the battery may be charged rapidly.

If the desired braking of the driver is greater than the (maximum) applicable generator braking torque b(t), then a hydraulic braking torque may be built up in addition to the generator braking torque. This is preferably carried out in such a manner, that the desired braking of the driver is completely satisfied. In the same way, in a situation in which no generator braking torque is applicable by the generator, the braking may be carried out purely hydraulically.

What is claimed is:

1. A controlling device for a brake system of a vehicle, comprising:
   a first receiving device, by which a sensor signal regarding an actuating intensity of a manipulation of a brake actuating element of the brake system is received;
   a second receiving device, by which an information signal regarding at least one theoretically applicable generator braking torque of a generator of the braking system is received;
   a generator control device, with the aid of which a setpoint generator braking torque of the generator is set in view of the sensor signal and the information signal, and the generator is accordingly controlled; and
   a valve control device, by which:
      if the stipulated setpoint generator braking torque is equal to zero, at least one accumulator opening valve of a brake circuit of the brake system is forced into a first valve position in such a manner, that displacement of a brake fluid from a master brake cylinder of the brake system into at least one wheel brake caliper of the brake circuit is effected, and a displacement of the brake fluid from the master brake cylinder into an accumulator of the brake circuit is prevented, and
      if the stipulated setpoint generator braking torque is not equal to zero, the at least one accumulator opening valve may be forced into a second valve position in such a manner, that the displacement of the brake fluid from the master brake cylinder into the accumulator may be effected, wherein:
         according to the generator control device, the setpoint generator braking torque is set in view of the information signal and a function of a variable derived from the sensor signal, the function being at a maximum, when the variable derived from the sensor signal is equal to a minimum actuating intensity, at which a braking force of a driver applied to the brake actuating element is transmittable to a displaceable piston of the master brake cylinder;
   wherein the generator control device sets a greatest of the theoretically applicable generator braking torques, which are one of less than and equal to the function of the variable derived from the sensor signal, as the setpoint generator braking torque.

2. The controlling device as recited in claim 1, further comprising:
   a pump control device, by which a desired pump mode of a pump of the brake circuit is set and the pump is accordingly controlled in view of a temporal decrease in the setpoint generator braking torque, the pump being able to pump the brake fluid from the accumulator of the brake circuit to the at least one wheel brake caliper of the brake circuit.

3. A brake system for a vehicle, comprising:
   a master brake cylinder;
   a controlling device for a brake system of a vehicle, including:
      a first receiving device, by which a sensor signal regarding an actuating intensity of a manipulation of a brake actuating element of the brake system is received;
      a second receiving device, by which an information signal regarding at least one theoretically applicable generator braking torque of a generator of the braking system is received;
      a generator control device, with the aid of which a setpoint generator braking torque of the generator is set in view of the sensor signal and the information signal, and the generator is accordingly controlled; and
a valve control device, by which:
if the stipulated setpoint generator braking torque is equal to zero, at least one accumulator opening valve of a brake circuit of the brake system is forced into a first valve position in such a manner, that displacement of a brake fluid from the master brake cylinder of the brake system into at least one wheel brake caliper of the brake circuit is effected, and a displacement of the brake fluid from the master brake cylinder into an accumulator of the brake circuit is prevented, and
if the stipulated setpoint generator braking torque is not equal to zero, the at least one accumulator opening valve may be forced into a second valve position in such a manner, that the displacement of the brake fluid from the master brake cylinder into the accumulator may be effected, wherein:
according to the generator control device, the setpoint generator braking torque is set in view of the information signal and a function of a variable derived from the sensor signal, the function being at a maximum, when a variable derived from the sensor signal is equal to a minimum actuating intensity, at which a braking force of a driver applied to the brake actuating element is transmittable to a displaceable piston of the master brake cylinder;
and
the at least one brake circuit, which is hydraulically connected to the master brake cylinder and includes the at least one wheel brake caliper, the accumulator, and the at least one accumulator opening valve, wherein when the at least one accumulator opening valve is in the first valve position, displacement of the brake fluid from the master brake cylinder into the at least one wheel brake caliper may be effected, and the displacement of the brake fluid from the master brake cylinder into the accumulator is prevented; and wherein when the at least one accumulator opening valve is in the second valve position, the displacement of the brake fluid from the master brake cylinder into the accumulator may be effected; and
a brake actuating element positioned at the master brake cylinder in such a manner, that when the brake actuating element is manipulated at at least the minimum actuating intensity, the braking force of the driver applied to the brake actuating element is transmitted to the displaceable piston of the master brake cylinder, so that the piston of the master brake cylinder is displaceable by the braking force of the driver, wherein while the brake actuating element is manipulated at an actuating intensity not equal to zero but under the minimum actuating intensity, a transmission of force between the brake actuating element and the piston of the master brake cylinder is prevented.

4. The brake system as recited in claim 3, further comprising:
a brake booster, by which, when the brake actuating element is manipulated at least below the minimum actuating intensity, the piston of the master brake cylinder is displaceable in such a manner that a volume of the brake fluid is selectively displaced from the master brake cylinder one of into the accumulator and into the at least one wheel brake caliper.

5. The brake system as recited in claim 3, wherein the at least one accumulator opening valve includes at least one wheel exhaust valve, which may be forced by the valve control device into a closed position as the first valve position, and into an at least partially open position as the second valve position.

6. The brake system as recited in claim 3, wherein when the at least one accumulator opening valve is in the second valve position, the displacement of the brake fluid from the master brake cylinder into the at least one wheel brake caliper is prevented.

7. A method for operating a brake system of a vehicle, comprising:
setting a setpoint generator braking torque in view of an actuating intensity variable regarding an actuating intensity of a manipulation of a brake actuating element of the brake system, and in view of an information item regarding at least one theoretically applicable generator braking torque of a generator of the brake system;
controlling the generator in view of the set setpoint braking torque;
if the set setpoint generator braking torque is equal to zero, forcing at least one accumulator opening valve of a brake circuit of the brake system into a first valve position, through which a displacement of a brake fluid from a master brake cylinder of the brake system into at least one wheel brake caliper of the brake circuit is effected, and the displacement of the brake fluid from the master brake cylinder into an accumulator of the brake circuit is prevented; and
if the set setpoint generator braking torque is not equal to zero, forcing the at least one accumulator opening valve into a second valve position, through which the displacement of the brake fluid from the master brake cylinder into the accumulator is effected;
detecting an increased actuating intensity variable regarding an increased actuating intensity of the manipulation of the brake actuating element;
comparing the increased actuating intensity variable to a threshold value regarding a minimum actuating intensity, at which a braking force of a driver applied to the brake actuating element is transmitted to a displaceable piston of the master brake cylinder; and
if the increased actuating intensity variable exceeds the threshold value, one of holding constant and reducing the setpoint generator braking torque in spite of the increased actuating intensity variable;
wherein if the increased actuating intensity variable is below the threshold value, an increased generator braking torque is ascertained in view of the increased actuating intensity variable, and a greatest of the theoretically applicable generator braking torques, which are still less than or equal to the increased generator braking torque, is set as the setpoint generator braking torque.

8. The method as recited in claim 7, wherein a desired pump mode of a pump of the brake circuit is set in view of a temporal decrease in the setpoint generator braking torque, and the pump is controlled in such a manner, that the brake fluid is pumped from the accumulator of the brake circuit to the at least one wheel brake caliper of the brake circuit.

* * * * *